Figure 1:
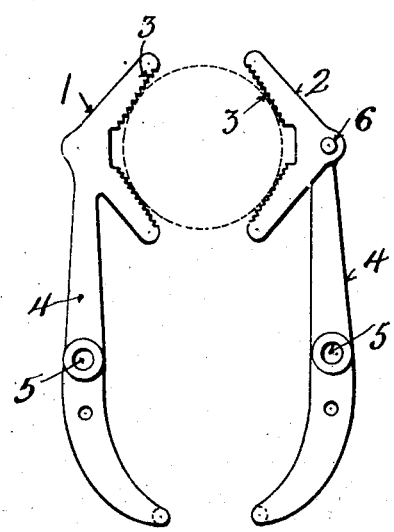

Dec. 4, 1928.

J. F. KOHLER 1,694,182

METHOD OF REMOVING SHELLS FROM NUTS

Filed Nov. 5, 1925

INVENTOR
John F. Kohler
BY Charles G. Hensley,
ATTORNEYS

Patented Dec. 4, 1928.

1,694,182

UNITED STATES PATENT OFFICE.

JOHN F. KOHLER, OF LARCHMONT MANOR, NEW YORK.

METHOD OF REMOVING SHELLS FROM NUTS.

Application filed November 5, 1925. Serial No. 67,004.

Figure 2:
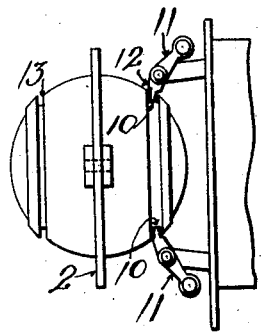
Figure 5:
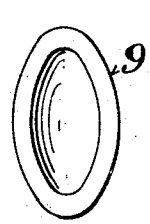
Figure 4:
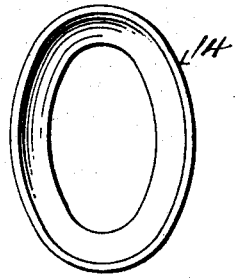
Figure 3:
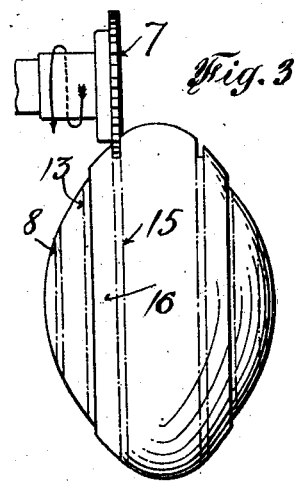

My invention relates to a method of removing shells from nuts and while not limited in its application to any particular kind of nuts, nevertheless it is especially useful in removing the hard outer shells from cocoanuts. Various methods of removing the hards shells from cocoanuts have been proposed, some of which included the operation of sawing or cutting in various ways through the shell and then removing broken pieces or sections following the cutting operation. So far, the various methods have not proven commercially successful and as a result, most if not all, the shelling of cocoanuts is done by hand. Under the present method the shell of a cocoanut is cut in such a manner that sections of the shell outside of or beyond the cuts will fracture and break off the nut with a minimum of pressure. This is accomplished by making the saw cuts in the form of circular cuts in planes parallel to the axis of the nut and at various positions or distances from the axis of the nut. The first cut made on each side of the axis results in the separation of a piece of shell having the general shape of a concavo-convex disc and the subsequent cuts cause the separation of sections of shell having the general form of annular rings. The cutting or dividing of the shell in the manner herein described causes the separated sections to fracture readily because of the angle at which the separated sections separate from the meat or kernel of the nut and because of the direction of the grain of the shell in relation to the separated sections. The present method makes it possible to mechanically remove the entire shell of the cocoanut without breaking or injuring the kernel or meat. If desired, the machine shown and described in my copending application for Letters Patent, Serial No. 567,695 filed June 12, 1922, may be used in carrying out the present method. Further details of the method will be set forth in the following description:

In the drawing forming part of this application,

Figure 1 is a view showing the grippers or jaws for holding the nut while the shell is being cut or sawn, Figure 2 is a view showing the nut held by these jaws, the view being taken at right angles to Figure 1, and it also shows one of the sections of the shell in the process of being separated, Figure 3 is a plan view of a nut after sections of the shell have been removed and showing one of the saws in the operation of making one of the cuts, Figure 4 is a face view of one of the sections of the shell removed from the nut, and Figure 5 is a similar view of the first section removed.

I prefer to employ a pair of gripping jaws for holding the nut, similar to those shown in my copending application, and which jaws are illustrated in Figures 1 and 2. The jaws 1 and 2 are arranged in a common plane with toothed gripping edges 3 arranged in diverging relation to each other and these jaws are arranged on the end of the levers 4 which rock from the fulcrums 5. The jaws 1, 2, cooperate to engage the shell of the cocoanut in a plane passing through the axis of the nut. The jaw 2 is pivoted at the point 6 upon the free end of an arm of the lever 4 which is fulcrumed at the point 5. The pivotal connection 6 permits the jaws 2 to accommodate themselves to nuts of various shapes.

It is a fact that cocoanuts are in many cases oval in contour and very often of uniform shape but this is not true of all cocoanuts as they come in a great variety of shapes, sometimes having a very large, flat end, being very large and flat at one end and tapering to a well defined point at the other end. In other cases the nut may be triangular in cross section having flat faces, and in fact, there are a great many nuts of very irregular shape. In speaking of the axis of the nut I refer to the axis running through part of the shell to which the stem was originally attached and this is in the direction of the grain of the shell regardless of whether this axis happens to be in any particular nut the major or minor axis in relation to its shape or proportions. In most cases, as with oval nuts, this axis will be the major axis but in certain peculiar shapes of nuts this may be the minor axis, so that in the description herein axis is to be taken to mean the central line in relation to and parallel with the direction of the grain of the shell.

The nut is placed between the gripper jaws 1, 2 so that the jaws grip on opposite sides of the pole at each end of the nut so that the axis of the nut in Figure 1 extends horizontally. If these gripper jaws are of narrow width and the jaws are all in the same plane they will obstruct only a comparatively narrow portion of the shell in the plane extending through the axis of the nut and the greater portion of the nut will be exposed on opposite sides of the jaws for the knives or saws to operate upon the shell. In my co-pending application above referred to, I have shown a machine wherein revolving saws operate simultaneously on opposite sides of the nut or on opposite sides of the gripping jaws in order that sections of the shell may be cut simultaneously from both sides of the nut, and I prefer to use such an arrangement in carrying out the present method although it will be understood that the cutting operations may be carried out on one side of the nut at a time.

Assuming that a nut has been placed in the gripping jaws, a cutting member which may be in the form of the circular saw 7, as shown in Figure 3, is presented to the nut in such a position as to saw through the shell or partly through the shell at a point between the dotted lines 8 shown in Figure 3 and while the saw is cutting it is revolved around a portion of the nut in the orbit represented by the dotted lines 8, which is in a plane parallel with the axis of the nut. When the saw has made a complete circular movement around this portion of the nut a circular cut will have been made in the shell and the portion outside of this cut will constitute a disc generally of concavo-convex shape as represented at 9 in Figure 5. Owing to the obtuse angle which the inner surface of this disc bears to the kernel or meat of the nut this disc may be removed sideways by a prying operation without fracturing the kernel and with comparatively slight pressure. I prefer to use in this operation the prying fingers 10 illustrated in my said co-pending application and which are partly illustrated in Figure 2. While in the latter figure these fingers are shown operating in a different cut of the shell from that which is here being described, nevertheless the operation is the same. The fingers 10 enter the cut made by the saw and the levers 11 which carry the fingers are rocked to cause the fingers to press upwardly on the portion of the shell outside of the cut while other fingers 12 engage against the edge of the shell inside the cut, so that the several fingers have a prying action and exert pressure on the section of the nut outside of the cut for the purpose of removing it from the kernel and from the remaining portion of the shell. When the saw cut has been made as represented by the lines 8 in Figure 3 a disc similar to that shown in Figure 5 is removed at one side of the nut and if the operation is performed on a machine like that shown in my co-pending application, a similar disc is simultaneously removed from the opposite side of the nut. After the disc 9 has been removed in the manner described, a second cut is made in the shell in a circular orbit as represented by the line 13 in Figure 3, the cut in this instance being parallel to the cut made between the dotted lines 8 but in a plane slightly closer to the axis of the nut. I have found it very practical to make these cuts in planes about one-half inch from each other. When the cut has been made on the line 13 in Figure 3, the section of shell outside of this cut is removed by a prying action in the same manner that the disc 9 was removed. The second section to be removed will be in the form of an annular piece as shown at 14 in Figure 4 although the shape will in many cases be irregular due to the irregular shapes of different nuts. Furthermore, the annular ring may not always be removed intact as in some cases it may break up into pieces. In fact, this is very apt to happen because the section is very weak due to the direction of the grain of the shell, and the direction of this grain also makes it possible to easily separate the annular ring of shell from the remaining portion of the shell even though the saw does not pass entirely through all portions of the shell. It is preferable to make the depth of cut such that the saw does not pass entirely through the shell even in the case of relatively thin shells, in order that the saw shall not cut into the kernel of the nut. Thus in many cases the saw does not entirely separate a section of shell but leaves the section connected by a comparatively weak connection with the remaining section of the shell and it will readily fracture under slight pressure. In the preferred operation the several saw cuts on the same side of the nut are made successively and the sections of shell separated by each cut are removed before a succeeding cut is made.

After the cut has been made on the lines 8, 13, of Figure 3 and the annular ring 14 has been removed from the shell, a third cut is made in a circular orbit between the lines 15 in Figure 3, this figure showing the saw in the operation of making this very cut. After the cut has been made between the lines 15 the section 16 of the shell will be removed in the same manner as the previous sections; that is, by prying the same away from the remaining portion of the shell. The same operations will be carried out on the opposite side of the nut by making circular cuts in the same manner as above described and these operations may be performed at the same time that the cuts are being made on the left side in Figure 3 in order that the operations may be carried out in the shortest possible time. When the cuts have been made on both sides of the axis of the nut and all the sections of shell outside of the several cuts have been removed there will still remain an annular ring of shell in the plane passing through the axis of the nut which is the portion engaged by the gripping jaws. A cross cut may be made in this remaining section of shell in the manner shown in my said co-pending application or this remaining section may be readily broken away by hand.

It will be apparent that each section of the shell which is segregated or partially separated by a circular cut of the saw, forms a separate unit which may be entirely removed, independently, by merely fracturing any slight connecting portion disposed at the bottom of the cut and by overcoming the adhesion of the particular section to the kernel of the nut. During the several cutting and prying operations the nut is firmly held by the gripping jaws acting on the unseparated section of the shell. Furthermore, in making the cuts in planes parallel with the axis of the nut the segregated sections, owing to the direction of the grain of the shell, are very weak and they very easily break away from the portion of the shell remaining on the nut. I believe that this is the only practical method of removing the shell without injury to the nut other than by the hand method in general use at the present time.

Having described my invention what I claim is:

1. The method of shelling a nut which consists of cutting or sawing a plurality of lines around the nut, said cuts being made in planes parallel with the axis of the nut and in removing the separate sections freed by the lines of cutting.

2. The method of shelling a nut which consists of cutting or sawing successively a plurality of lines completely around portions of the nut, said cuts being made in planes parallel with the axis of the nut, and in removing the sections freed by the lines of cutting.

3. The method of shelling a nut which consists of cutting or sawing successively a plurality of lines completely around portions of the nut, said cuts being made in planes parallel with the axis of the nut and successively and progressively nearer the central line of the nut, and in successively removing the sections freed by the cutting or sawing operations.

Signed at the city, county and State of New York, this 18th day of October, 1924.

JOHN F. KOHLER.